US007447730B2

(12) United States Patent
Iguchi et al.

(10) Patent No.: US 7,447,730 B2
(45) Date of Patent: Nov. 4, 2008

(54) IMAGE FORMING APPARATUS

(75) Inventors: Yukinobu Iguchi, Toyokawa (JP);
Fumio Maekawa, Aichi-Ken (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 729 days.

(21) Appl. No.: 10/310,961

(22) Filed: Dec. 6, 2002

(65) Prior Publication Data
US 2003/0111218 A1 Jun. 19, 2003

(30) Foreign Application Priority Data
Dec. 14, 2001 (JP) ............................. 2001-382196

(51) Int. Cl.
G06F 15/16 (2006.01)
G03G 15/00 (2006.01)
G03G 21/20 (2006.01)

(52) U.S. Cl. ........................ 709/201; 709/250; 399/8; 399/44; 399/91

(58) Field of Classification Search ............... 399/8, 399/33, 36, 37, 44, 69, 91, 92, 94, 97
See application file for complete search history.

(56) References Cited

U.S. PATENT DOCUMENTS

| 5,144,366 | A | | 9/1992 | Sakamoto et al. |
| 5,372,015 | A | * | 12/1994 | Suzuki et al. ............... 62/228.4 |
| 6,283,380 | B1 | * | 9/2001 | Nakanishi et al. .......... 236/49.3 |
| 6,594,456 | B2 | * | 7/2003 | Kimizuka et al. ............. 399/92 |
| 6,604,023 | B1 | * | 8/2003 | Brown et al. ................ 700/276 |
| 6,628,906 | B2 | * | 9/2003 | Kimizuka ..................... 399/44 |
| 6,636,808 | B1 | * | 10/2003 | Brown et al. .................... 702/3 |
| 6,641,244 | B2 | * | 11/2003 | Dougherty et al. ............ 347/19 |
| 6,985,675 | B2 | * | 1/2006 | Guddanti et al. ............... 399/8 |
| 2001/0025349 | A1 | * | 9/2001 | Sharood et al. ............. 713/340 |
| 2002/0062365 | A1 | * | 5/2002 | Nishikawa et al. .......... 709/223 |
| 2002/0116157 | A1 | * | 8/2002 | Markle et al. ............... 702/188 |
| 2004/0243684 | A1 | * | 12/2004 | Ha et al. ..................... 709/208 |

FOREIGN PATENT DOCUMENTS

| JP | S58-98523 | 7/1983 |
| JP | 2-115863 | 4/1990 |
| JP | 04-166959 | 6/1992 |
| JP | 07-281489 | 10/1995 |
| JP | 08-030183 | 2/1996 |

(Continued)

OTHER PUBLICATIONS

Japanese Office Action with English-language Translation, dated May 22, 2007.

*Primary Examiner*—John B. Walsh
(74) *Attorney, Agent, or Firm*—Buchanan Ingersoll & Rooney PC

(57) ABSTRACT

An image forming apparatus such as a copier and an air conditioner communicate with one another in a network. The air conditioner provides information regarding ambient temperature and/or humidity to the image forming apparatus. Based upon this information, the image forming apparatus selectively activates systems within the apparatus that regulate its internal temperature and humidity levels, to thereby achieve power savings. The image forming apparatus provides information regarding its operation state to the air conditioner. The air conditioner uses this information to adjust its heating or cooling operations to compensate for the heat generated by the image forming apparatus when it is operating.

10 Claims, 8 Drawing Sheets

FOREIGN PATENT DOCUMENTS

| | | |
|---|---|---|
| JP | 8-220816 | 8/1996 |
| JP | 10-123716 | 5/1998 |
| JP | 10-141746 | 5/1998 |
| JP | 11-132532 | 5/1999 |
| JP | 11-219086 | 8/1999 |
| JP | 2000-238379 | 9/2000 |
| JP | 2001-086572 | 3/2001 |

* cited by examiner

IMAGE FORMING APPARATUS

This disclosure is based upon Japanese Patent Application No. 2001-382196, filed Dec. 14, 2001, the contents of which are incorporated herein by reference.

FIELD OF THE INVENTION

The present invention relates to an image forming apparatus, such as a digital copying machine or a printer, that is capable of working in coordination with an air conditioner that adjusts the ambient temperature and/or humidity of a room.

BACKGROUND OF THE INVENTION

As the use of air conditioners and other environmental control devices becomes commonplace, image forming apparatuses such as copying machines or printers are increasingly being installed in air-conditioned rooms in offices and homes.

However, in the past, the image forming apparatus and the air conditioner did not operate in a linked fashion, and worked independently from each other. Consequently, the problem arises that, due to the internal heat generated when the image forming apparatus operates, if the image forming apparatus is used over a long period of time, the generated heat can affect the ambient temperature and humidity in the room, because the air conditioner does not adjust the temperature and humidity in the room in accordance with the operation status of the image forming apparatus. The air conditioner is only capable of adjusting the ambient temperature and humidity by detecting such parameters using its own sensors. Therefore, optimal adjustment of the ambient temperature and humidity in the room in accordance with the operation status of the image forming apparatus has not been achieved previously.

In addition, an image forming apparatus generally has a moisture eliminating function to eliminate the moisture contained in the transfer medium (paper) in the paper supply trays, a condensation preventing function to prevent the formation of condensation on the lenses and mirrors of the systems that read or write image information, and a cooling function to cool down the heat-generating components such as motors and lamps as well as the interior of the apparatus, in order to adjust the temperature and moisture content inside the apparatus. For example, with regard to the cooling function, the image forming apparatus generally uses feed forward control to drive a cooling fan at all times during image formation.

However, the operation mode for each of these functions of a conventional image forming apparatus is fixed at all times, regardless of the temperature or humidity in the room. For example, with regard to the cooling function, the cooling capacity is set such that the temperature of the components of the image forming apparatus is maintained at or below a level that does not pose a problem in regard to safety standards or mechanical functions even when the ambient temperature is at the highest end of the range within which the image forming apparatus can be used, and the operation mode is set such that the cooling function is in operation at all times during the operation of the image forming apparatus. Consequently, where the ambient temperature is around 25° C., which is a common room temperature, the cooling means continues to provide excessive cooling, resulting in the problems of increased power consumption and noise. These problems are not limited to the cooling function, but also occur with regard to the moisture eliminating and condensation preventing functions.

The present invention was created in view of these problems, and seeks to provide optimal adjustment of the ambient temperature and/or humidity using an air conditioner by having the image forming apparatus operate in coordination with the air conditioner when the image forming apparatus will have a negative impact on the ambient temperature and humidity, and conversely, to achieve power conservation and less noise by adjusting the temperature and moisture content inside the image forming apparatus in accordance with the ambient temperature and humidity detected by the air conditioner, as well as to provide an image forming apparatus that realizes this object.

SUMMARY OF THE INVENTION

In accordance with one aspect of the present invention, a reading means reads information regarding the operation of the image forming apparatus. The information regarding the operation of the image forming apparatus read by the reading means is transmitted to the air conditioner, to enable the air conditioner to adjust the ambient temperature and/or humidity in the room in which the image forming apparatus is installed, in accordance with the heat generated by the image forming apparatus.

Using this construction, the image forming apparatus reads the operation information comprising the number of print jobs or the like being processed by the apparatus, for example, and transmits the operation information to the air conditioner. The air conditioner then adjusts the ambient temperature and/or humidity in the room in which the image forming apparatus is installed in accordance with the amount of heat that will be generated through the operation of the image forming apparatus, which is anticipated from the operation information thus received. Because the operations of the image forming apparatus and the air conditioner are coordinated in this way, the ambient temperature and humidity can be optimally adjusted by the air conditioner in accordance with the operation of the image forming apparatus.

In order to attain the objectives described above, this invention also includes adjusting means that adjusts the temperature and/or moisture content inside the image forming apparatus, and receiving means that receives information regarding the ambient temperature and/or humidity in the room in which the image forming apparatus is installed. Such information is preferably detected by the temperature sensor and/or humidity sensor of the air conditioner. Control means in the image-forming apparatus controls the adjusting means based on the information regarding the ambient temperature and/or humidity received by the receiving means.

Using this construction, the image forming apparatus receives information regarding the ambient temperature and/or humidity from the air conditioner, and controls, based on the ambient temperature and/or humidity information received, the adjusting means such as the exhaust fan, the condensation prevention heater and the moisture elimination heaters to adjust the temperature and/or moisture content inside the image forming apparatus. Since the operations of the image forming apparatus and the air conditioner can be coordinated in this way, such that the temperature and moisture content inside the image forming apparatus are adjustable in accordance with the ambient temperature and humidity detected by the air conditioner, power conservation and less noise can be achieved when utilizing the cooling function, the moisture eliminating function or the condensation preventing function of the image forming apparatus.

Moreover, since the temperature and/or humidity readings detected by the sensors included in the air conditioner are used, it is not necessary to separately equip the image forming apparatus with sensors to detect the ambient temperature and/or humidity, enabling the image forming apparatus to have a simpler construction and a lower cost.

Furthermore, it is preferred that the control means control the adjusting means based on the information regarding the ambient temperature and/or humidity received by the receiving means even when the main switch of the image forming apparatus is OFF.

Using this construction, since the temperature and moisture content inside the apparatus are adjusted in accordance with the ambient temperature and humidity even when the main switch is OFF, power conservation can be achieved for the image forming apparatus while at the same time providing the proper moisture content of the paper immediately after the power is turned ON and preventing the formation of condensation on the mirrors and the lenses, for example.

DETAILED DESCRIPTION OF THE PREFERRED EMBODIMENTS

Figure 1:
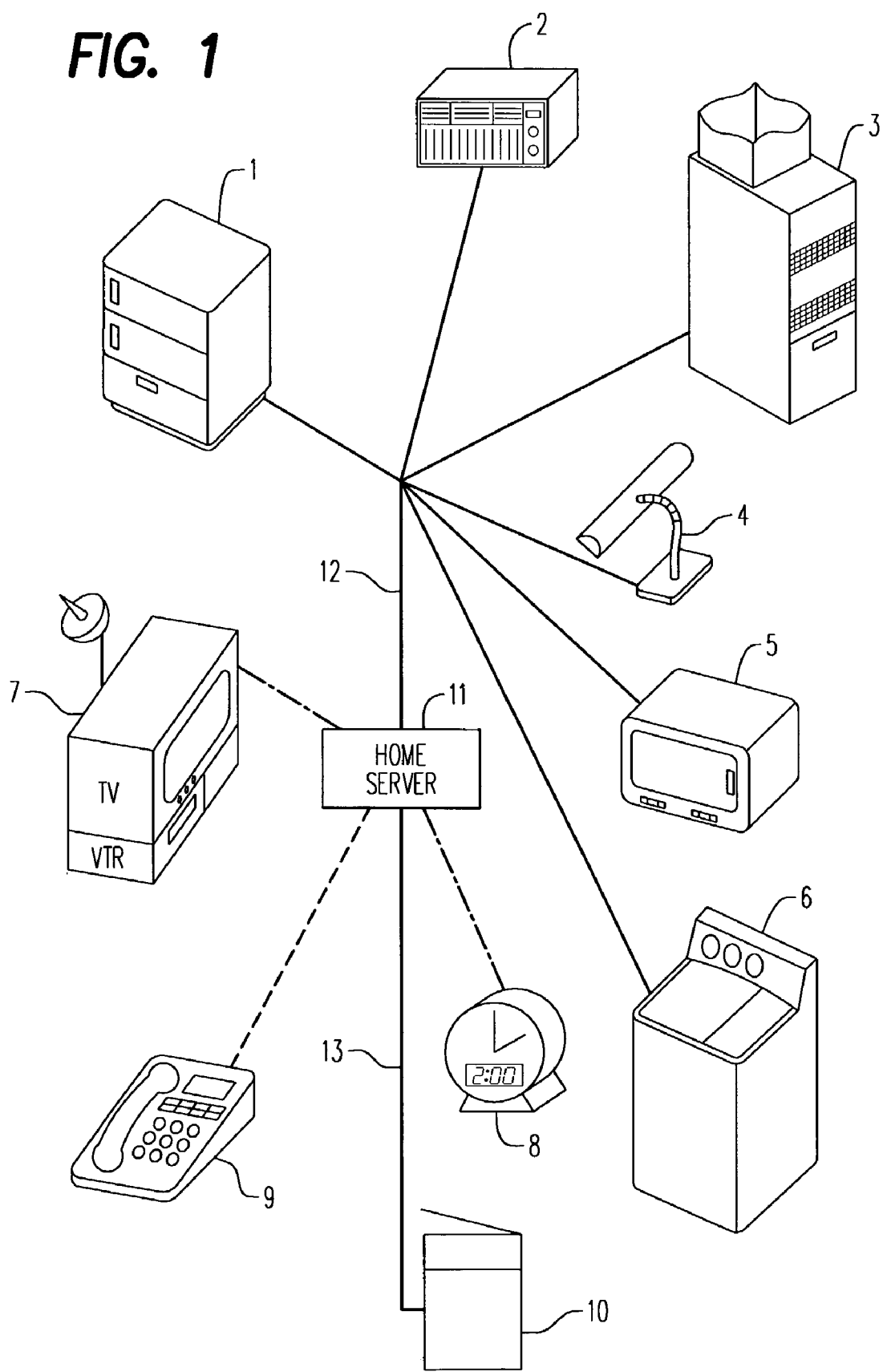
FIG. 1 is a drawing showing the overall construction of a home automation system in which the digital copying machine pertaining to the present invention is applied.

FIG. 1 is a drawing showing the overall construction of a home automation system that includes a digital copying machine, which comprises the image forming apparatus in one embodiment of the present invention.

This home automation system includes a refrigerator 1, an air conditioner 2, a home heater 3, a fluorescent lamp 4, a microwave oven 5, a washing machine 6, a television receiver 7, a clock 8, a telephone 9, a digital copying machine 10 and a home server 11 that performs overall control of each of these apparatuses.

The refrigerator 1, the air conditioner 2, the home heater 3, the fluorescent lamp 4, the microwave oven 5 and the washing machine 6 are connected to the home server 11 using an electrical cable 12 and comprise a sub-network. The television receiver 7 and the clock 8 are connected to the home server 11 using infrared lines and comprise a sub-network. The telephone 9 is wirelessly connected to the home server 11 and comprises a sub-network. The digital copying machine 10 is connected to the home server 11 using an electrical cable 13 and comprises a sub-network. The construction of the network is not limited to that described above, however, and other means such as ultrasound or a plurality of means may be used for the connection of the apparatuses.

Figure 2:
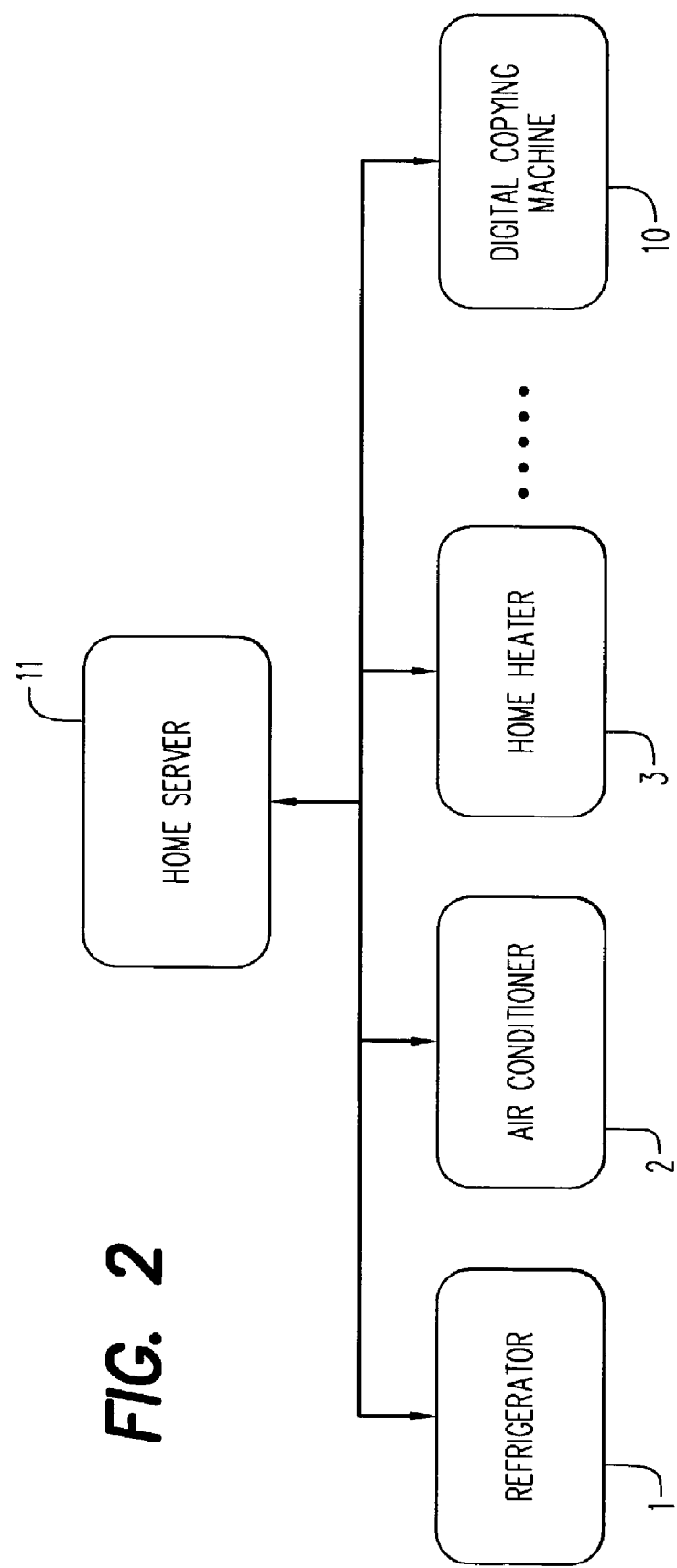
FIG. 2 is a block diagram showing the logical format of the home automation system shown in FIG. 1.

FIG. 2 shows the logical format of the network connection (i.e., the so-called home automation system) via the home server 11 of the digital copying machine 10 as well as the other electronic appliances and the air conditioner 2 that performs air conditioning of the room in which the digital copying machine 10 is installed. In this home automation system, the various electronic appliances can be controlled in a unified fashion by the home server 11.

Figure 5:
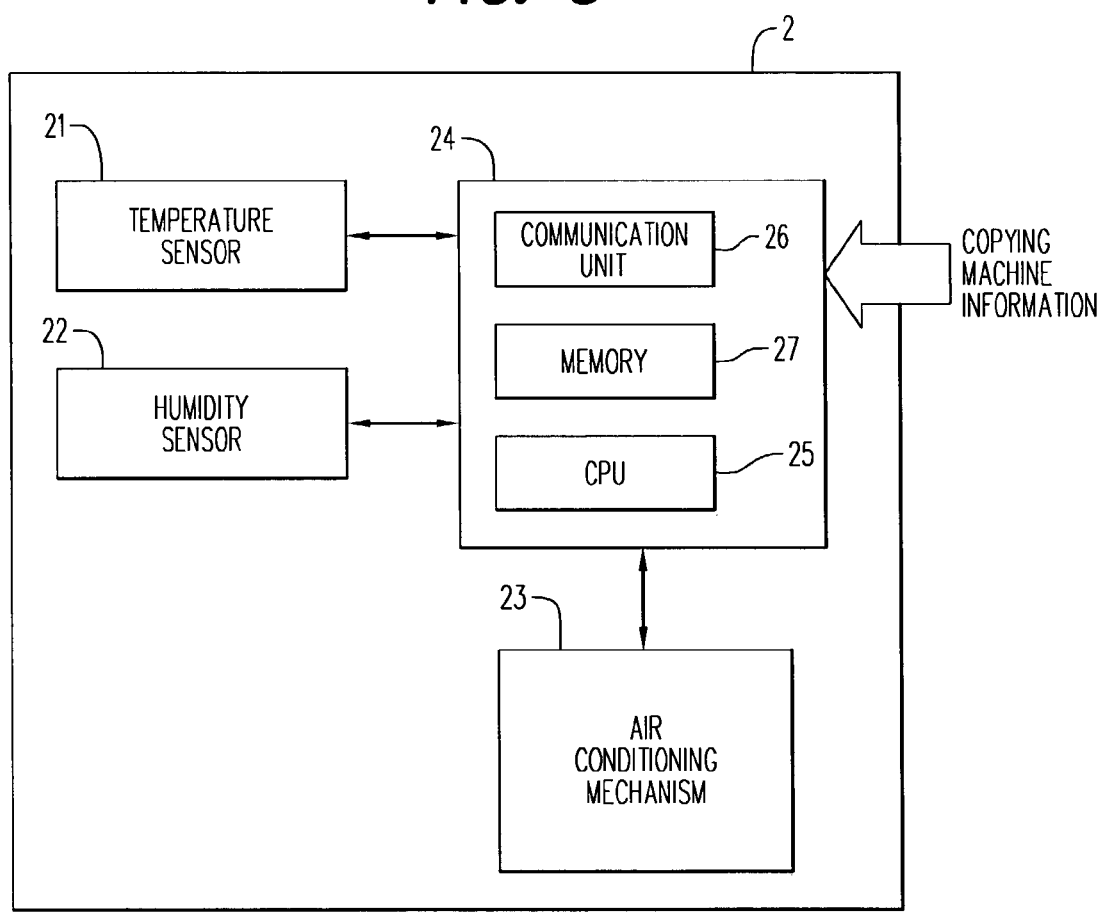
FIG. 5 is a block diagram showing the electrical construction of the air conditioner.

Therefore, the air conditioner 2 detects the ambient temperature and humidity in the room in which the digital copying machine 10 is installed using an internal temperature sensor 21 and a humidity sensor 22 (see FIG. 5). The air conditioner 2 transmits ambient atmosphere information including the information regarding the ambient temperature and humidity, which constitute the detection results, and transmits information regarding the target temperature and target humidity to be attained by air conditioning to the digital copying machine 10 via the home server 11. The digital copying machine 10 controls the driving of an internal exhaust fan 130, condensation prevention heater 140 and moisture elimination heaters 150 (see FIG. 3) based on the received ambient atmosphere information.

The digital copying machine 10 also transmits information regarding the number of print jobs, which comprises operation information that it has read, to the air conditioner 2 via the home server 11. The air conditioner 2 increases the cooling power or reduces the heating power based on the information thus received regarding the number of print jobs.

Figure 3:
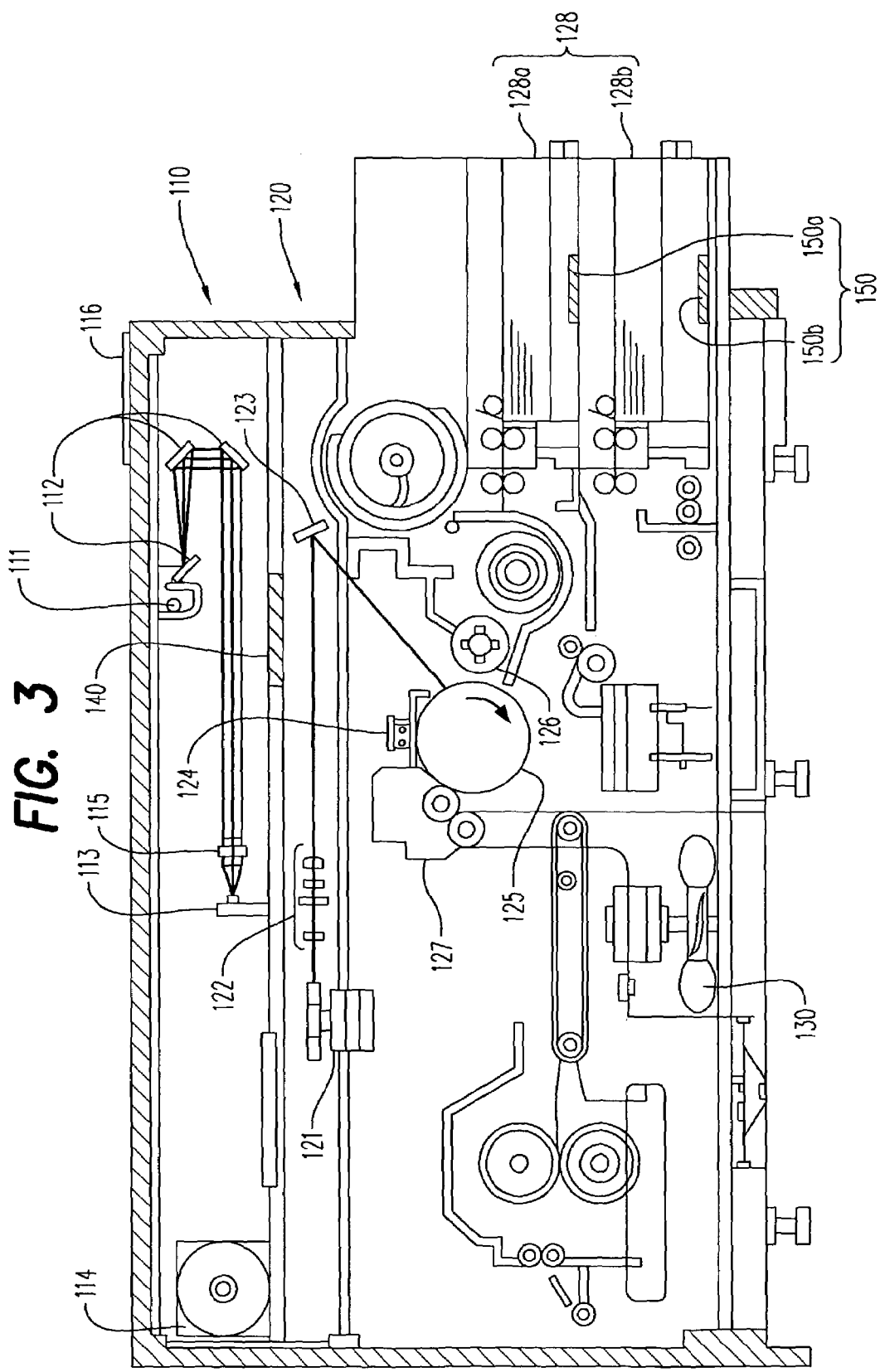
FIG. 3 is a schematic drawing showing the construction of the digital copying machine.

FIG. 3 is a schematic drawing showing the construction of the digital copying machine 10.

This digital copying machine 10 has a reading optical system 110 that reads the original image placed on the platen glass and a writing optical system 120 that writes image information onto the photoreceptor drum 125 that serves as an image carrier.

The reading optical system 110 includes an light source 111 to illuminate the original document, a mirror unit 112 to lead the reflected light from the original document to a condenser lens 115, a reading element 113 to read the condensed reflected light and a fan 114 to release the heat generated from the light source 111 into the room. An operation panel 116 including a start key (not shown) is located on the top surface of the digital copying machine 10.

The writing optical system 120, which has a polygon mirror 121, a lens unit 122 and a mirror 123, reflects the light from an illumination source not shown using the polygon mirror 121 in a manner that ensures timing, condenses the reflected light using the lens unit 122, and reflects the condensed light using the mirror 123 toward a prescribed direction in order to direct the light to the surface of the photoreceptor drum 125, which has been charged by a charger 124. Consequently, an electrostatic latent image that corresponds to the original image (the read image) is formed on the photoreceptor drum 125. This electrostatic latent image is developed using toner that is carried by a developing roller 126. After the toner image is transferred to a transfer medium (a sheet of paper), the toner remaining on the surface of the photoreceptor drum 125 is removed by a cleaning unit 127 in order for the photoreceptor drum 125 to prepare for the next electrostatic latent image.

The member referenced as 130 in the drawing is an exhaust fan, and the heat of the copying machine in general is expelled by this exhaust fan 130.

The reading optical system 110 includes a condensation prevention heater 140, and the formation of condensation on the lenses and mirrors of the reading optical system 110 and the writing optical system 120 is prevented by this condensation prevention heater 140.

Moisture elimination heaters 150 such as sheathed heaters comprising heating wires are located in the paper supply trays 128. Specifically, a moisture elimination heater 150a is located in the paper supply tray 128a while a moisture elimination heater 150b is located in the paper supply tray 128b. Each of these moisture elimination heaters 150 is located at the bottom of a paper supply tray 128, such that by heating the bottom of the paper supply tray 128, it disperses the heat throughout the entire tray, which in turn warms the transfer medium and eliminates moisture therefrom. This embodiment includes two paper supply trays 128, but the number of paper supply trays is not limited to two.

Figure 4:
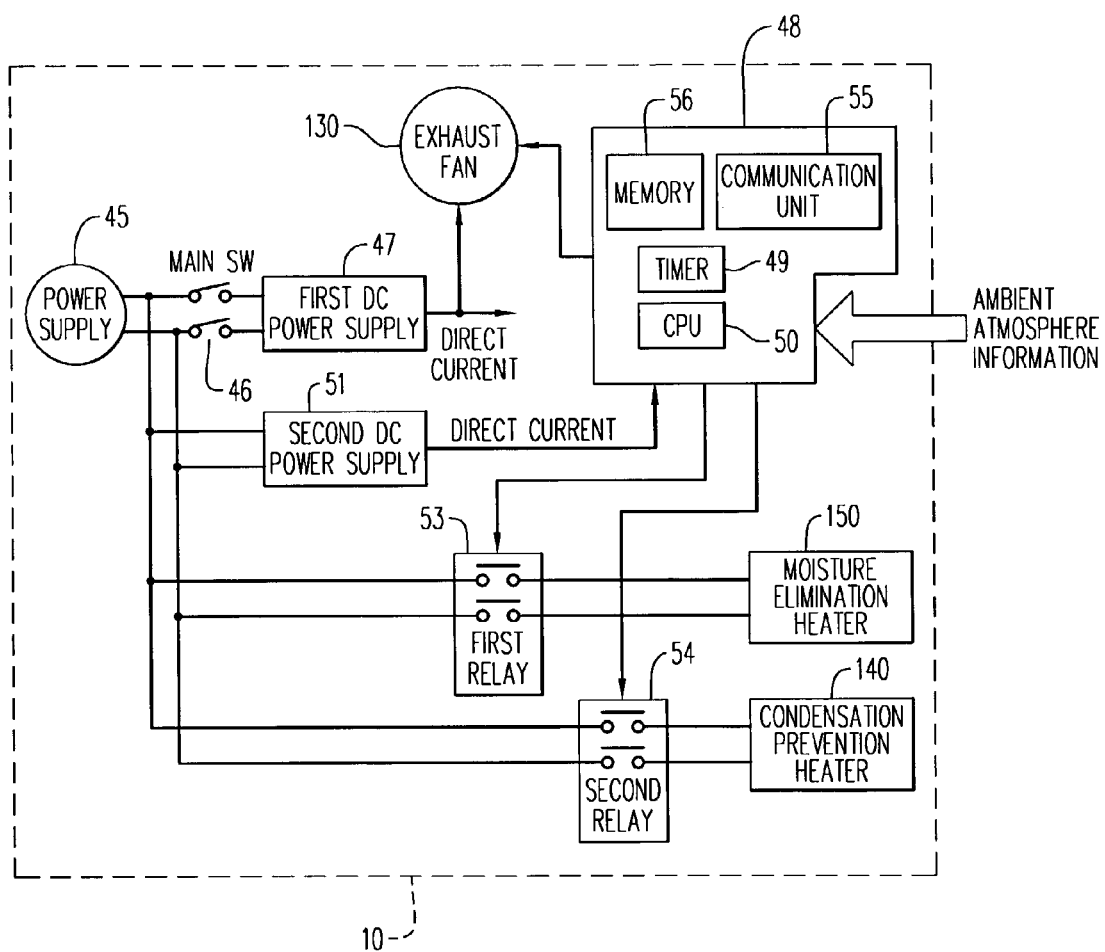
FIG. 4 is a block diagram showing the electrical construction of the digital copying machine.

FIG. 4 is a block diagram of the circuits related to control of the driving of the exhaust fan 130, the condensation prevention heater 140 and the moisture elimination heaters 150 in the digital copying machine 10.

With reference to FIG. 4, 130 is the exhaust fan shown in FIG. 3, and 140 and 150 are the condensation prevention heater and the moisture elimination heaters shown in FIG. 3, respectively 45 is a power supply and 47 is a first direct current (DC) power supply. The power supply 45 and the first DC power supply 47 are connected via a main switch 46. The exhaust fan 130 as well as driving devices that are not shown but drive the reading system, the conveyance system, the image formation system and other components of the copying machine 10 are connected to the first DC power supply 47. Therefore, when the main switch 46 is turned ON, power is supplied from the power supply 45 to the first DC power supply 47, from which power is supplied to the various driving devices for the reading system, the conveyance system, the image formation system, etc., as well as to the exhaust fan, whereupon the copying machine 10 enters a state in which the operation thereof is enabled as a practical matter.

A second DC power supply 52 is also directly connected to the power supply 45, and a control unit 48 is connected to this second DC power supply 52. The control unit 48 has a timer 49, a central processing unit (hereinafter 'CPU') 50, a communication unit 55 and a memory 56. The second DC power supply 52 receives power supply from the power supply 45 at all times, and therefore, the timer 49, the CPU 50, the communication unit 55 and other components of the control unit 48 also receive power supply at all times, such that even when the main switch 46 of the copying machine 10 is OFF, the CPU 50, etc. are capable of operating.

The moisture elimination heaters 150 are connected to the power supply 45 via a first relay 53, and the condensation prevention heater 140 is connected to the power supply 45 via a second relay 54.

The CPU 50 performs overall control of the various components of the copying machine 10, and in this embodiment, controls the operations of the first relay 53, the second relay 54 and the exhaust fan 130 in accordance with the ambient atmosphere information received from the home server 11 and the ON/OFF state of the main switch 46.

To describe the construction more specifically, when the main switch 46 is OFF, the temperature and moisture content inside the digital copying machine 10 are close to those of the ambient environment, and the transfer medium in the paper supply trays 128 may include an elevated degree of moisture content depending on the ambient environment. Therefore, if image formation is carried out using such transfer medium when the main switch 46 is turned ON, the electrostatic latent image on the photoreceptor drum 125 may not be successfully transferred, or the transfer medium, which receives pressure through sudden heating by the fusing device, may become creased. In addition, other problems may occur such as paper jam due to transfer medium conveyance failure and an inability to perform normal image reading and writing due to the presence of condensation on the mirrors and lenses.

In order to address this situation, moisture elimination and condensation prevention are achieved by supplying power to the condensation prevention heater 140 and the moisture elimination heaters 150 while the main switch 46 is OFF. However, it is not necessary to supply power to the condensation prevention heater 140 and the moisture elimination heaters 150 at all times while the main switch 46 is OFF. Accordingly, in this embodiment, ambient atmosphere information is received from the air conditioner 2 via the home server 11, and power is supplied to the condensation prevention heater 140 and the moisture elimination heaters 150 via the first relay 51 and the second relay 52, respectively, only when the ambient humidity equals or exceeds a preset level. Because the temperature inside the copying machine increases due to the heat sources (such as the fusing roller, the light source and the heat source used to prevent condensation on the photoreceptor drum) within the digital copying machine 10 after the main switch 46 is turned ON, moisture absorbed by the transfer medium in the paper supply trays 128 is automatically eliminated and the transfer medium no longer poses a problem when used.

Conversely, where the temperature inside the copying machine increases excessively due to the heat sources within the digital copying machine 10, because safety standards or quality standards can no longer be met by the temperature of the electric components in a high ambient temperature environment, the temperature inside the copying machine performing image formation must be reduced using the exhaust fan 130 in order to maintain the components in a trouble-free state. However, because fan operation is not necessary where the ambient temperature is low, ambient atmosphere information is received from the air conditioner 2 via the home server 11, and where the ambient temperature is lower than a preset level, the exhaust fan 130 is not driven.

The communication unit 55 functions as a transmitter/receiver that carries out transmission and reception to and from the air conditioner 2 via the home server 11. Preset values for ambient temperature and humidity, which serve as triggers for the operation of the condensation prevention heater 140 and the moisture elimination heaters 150, are stored in advance in the memory 56.

FIG. 5 is a block diagram showing the electrical construction of the air conditioner 2.

The air conditioner 2 includes a temperature sensor 21 that detects the ambient temperature, a humidity sensor 22 that detects the ambient humidity, and a well-known air conditioning mechanism 23 for cooling or heating of the room, as well as a control unit 24. Furthermore, the control unit 24 includes a CPU 25, a communication unit 26 and a memory 27.

The CPU 25 performs overall control of the air conditioner 2, and after receiving copying machine information, such as the number of print jobs from the digital copying machine 10 in particular, via the home server 11, the CPU 25 determines whether or not the digital copying machine 10 is ON based on the copying machine information, and where it is determined that the digital copying machine 10 is ON, the CPU 25 performs prescribed control. That is, the CPU 25 determines whether or not the ambient temperature detected by the temperature sensor 21 exceeds the preset level, and when the ambient temperature exceeds the preset level, the ambient temperature will further increase as a result of the heat generated by the digital copying machine 10 due to the execution of print jobs, the CPU 25 increases the cooling power in accordance with the number of print jobs, information regarding which is included in the copying machine information. On the other hand, when the ambient temperature is equal to or lower than the preset level, the CPU 25 reduces the heating power in accordance with the number of print jobs, the information regarding which is included in the copying machine information, taking into consideration the heat generated by the digital copying machine 10 due to the execution of the print jobs. Where the CPU 25 of the air conditioner determines that the digital copying machine is OFF, it performs normal air conditioning control.

The communication unit 26 functions as a transmitter/receiver that performs transmission and reception of information to and from the digital copying machine 10 via the home server 11. A preset value for the ambient temperature based on which it is determined whether to increase the cooling power or to reduce the heating power in accordance with the number of print jobs of the digital copying machine 10, and a table that shows the relationship between the number of print jobs and the amount by which to increase the cooling power or to reduce the heating power, are stored in advance in the memory 27.

Figure 6:
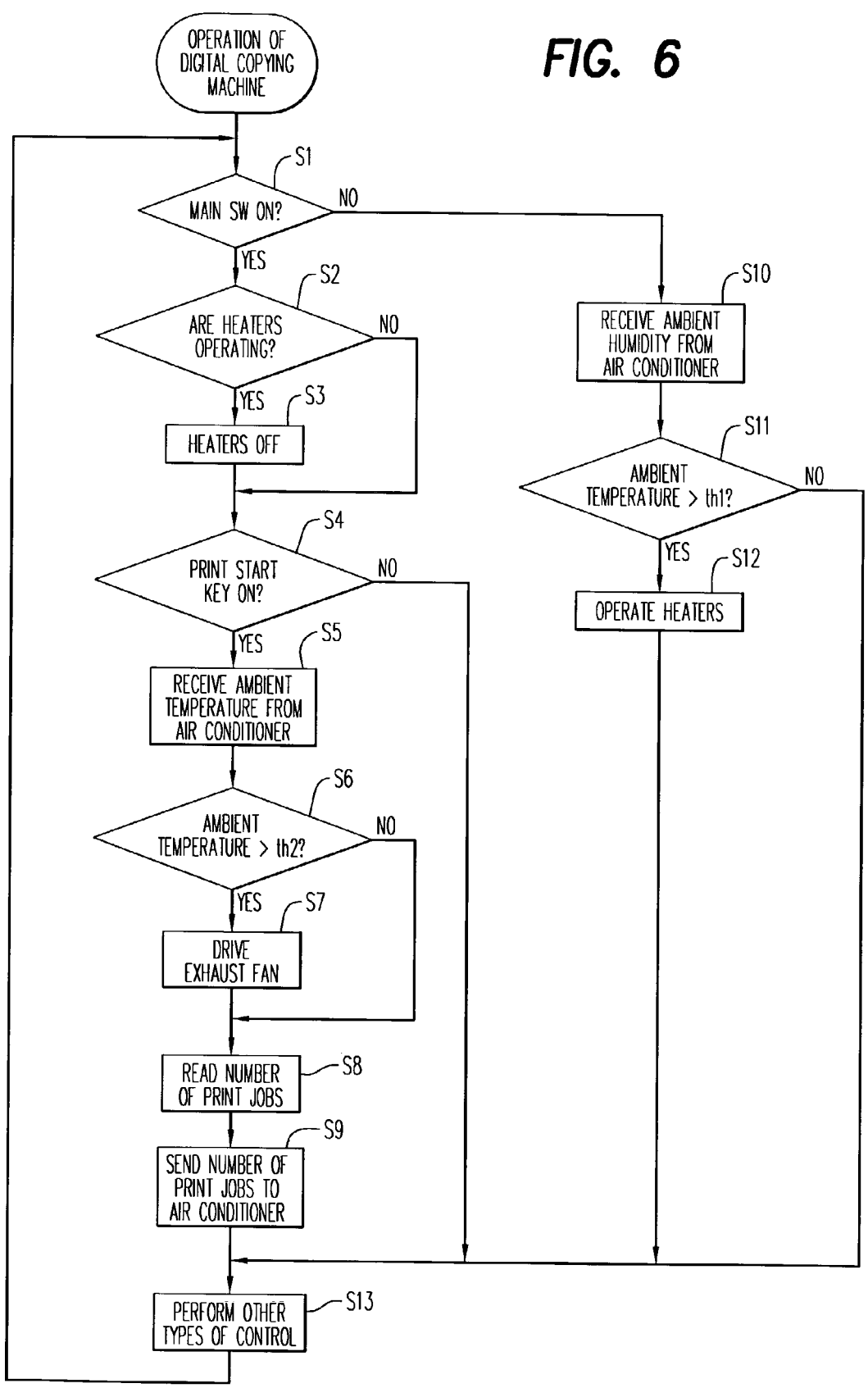
FIG. 6 is a flow chart showing the operation of the digital copying machine.

The operation of the digital copying machine 10 in the home automation system described above will now be explained with reference to the flow chart of FIG. 6. In the description below and the drawing, 'step' is abbreviated as 'S'.

First, in S1, the CPU 50 determines whether or not the main switch 46 is ON, and where it is determined that the main switch 46 is ON (YES in S1), the CPU 50 advances to S2. Where it is determined that the main switch 46 is not ON (NO in S1) on the other hand, the CPU 50 advances to S10.

The CPU 50 determines whether or not the main switch 46 is ON in this way in order to selectively switch to the control routine regarding the exhaust fan 130 when the main switch 46 is ON, and to selectively switch to the control routine regarding the condensation prevention heater 140 and the moisture elimination heaters 150 when the main switch 46 is not ON (i.e., when it is OFF).

In S2, the CPU 50 determines whether or not the condensation prevention heater 140 and the moisture elimination heaters 150 are operating, and where it is determined that at least either the heater 140 or the heaters 150 are operating (YES in S2), the CPU 50 advances to S3, whereupon the CPU 50 turns OFF the operating heater(s) and advances to S4. On the other hand, where it is determined that neither of the heater 140 nor the heaters 150 is operating (NO in S2), the CPU 50 moves on to S4.

The operating heaters are turned OFF in this way if either the heater 140 or the heaters 150 are operating because after the main switch 46 is turned ON, the temperature inside the copying machine increases due to the heat sources (such as the fusing roller, the light source and the heat source that prevents the formation of condensation on the photoreceptor drum) within the digital copying machine 10, the moisture of the transfer medium in the paper supply trays 128 is automatically eliminated and condensation on the mirrors and the lenses is prevented, making the copying machine trouble-free during use.

In S4, the CPU 50 determines whether or not the print start key on the operation panel 116 is ON, to detect whether a print operation is currently being performed. If it is determined that the print start key is ON (YES in S4), the CPU 50 advances to S5. On the other hand, where it is determined that the print start key is not ON (NO in S4), the CPU 50 advances to S13.

The control routine regarding the exhaust fan 130 described below is not performed when the print start key is not ON, as described above, because where the print start key is not ON and thus printing is not underway, the temperature inside the copying machine does not increase unnecessarily.

In S5, the CPU 50 receives information regarding the ambient temperature from the air conditioner 2 via the home server 11, and then advances to S6.

In S6, the CPU 50 determines from the received ambient temperature information whether or not the ambient temperature exceeds the preset temperature th2, and where it is determined that the ambient temperature exceeds the preset temperature th2 (YES in S6), the CPU 50 advances to S7 and drives the exhaust fan 130, whereupon it advances to S8. On the other hand, where it is determined that the preset temperature th2 is not exceeded (NO in S6), the CPU 50 advances directly to S8.

As described above, by driving the exhaust fan 130 when the ambient temperature exceeds the preset temperature th2, the temperature inside the copying machine that is performing image formation can be reduced so that the copying machine may be maintained in a trouble-free state. In addition, when the ambient temperature is equal to or lower than the preset temperature th2, making it unnecessary to reduce the temperature inside the copying machine, the exhaust fan 130 is not driven, and consequently power conservation and less noise can be achieved in connection with the exhaust fan 130.

In S8, the information regarding the number of print jobs is read by the CPU 50. The CPU 50 then advances to S9 and sends the information thus read to the air conditioner 2 via the home server 11, whereupon the CPU 50 advances to S13. The transmitted information regarding the number of print jobs is used for the control of the air conditioner 2.

In S10, on the other hand, the CPU 50 receives information regarding the ambient humidity from the air conditioner 2 via the home server, and advances to S11.

In S11, the CPU 50 determines based on the information regarding the ambient humidity whether or not the ambient humidity exceeds the preset humidity th1, and where it is determined that the ambient humidity exceeds the preset humidity th1 (YES in S11), the CPU 50 advances to S12 and operates the condensation prevention heater 140 and the moisture elimination heaters 150, whereupon the CPU 50 advances to S13. Where it is determined that the preset humidity th1 is not exceeded (NO in S11) on the other hand, the CPU 50 advances directly to S13.

As described above, by operating the condensation prevention heater 140 and the moisture elimination heaters 150 when the ambient humidity exceeds the preset humidity th1, the formation of condensation on the mirrors and the lenses immediately after power is turned ON can be prevented, and the moisture content of the transfer medium in the paper supply trays 128 can be maintained at a low level while the main switch 46 is OFF. In addition, because the condensation prevention heater 140 and/or the moisture elimination heaters 150 are not operated when the ambient humidity is equal to or lower than the preset humidity th1, making it unnecessary to reduce the moisture content inside the copying machine, power conservation can be achieved in connection with the condensation prevention heater 140 and the moisture elimination heaters 150 via non-operation thereof.

In S13, the CPU 50 performs other types of control and then returns to S1.

The operation of the air conditioner 2 in the home automation system will now be described with reference to the flow chart of FIG. 7.

First in S21, the CPU 25 receives copying machine information from the digital copying machine 10 via the home server 11 and advances to S22.

In S22, the CPU 25 determines, based on the received copying machine information, whether or not the print start key on the operation panel 116 of the digital copying machine 10 has been turned ON, and where it is determined that the print start key has been turned ON (YES in S22), the CPU 25 advances to S23. Where it is determined that the print start key has not been turned ON (NO in S22) on the other hand, the CPU 25 moves on to S28.

It is determined in this way whether or not the print start key has been turned ON in order to trigger the CPU 25 to selectively switch to the cooling power or heating power setting routine in accordance with the number of print jobs, i.e., the amount of heat that will be generated from the copying machine, when the print start key has been turned ON, and to selectively switch to the regular air conditioning routine when the print start key has not been turned ON.

In S23, the CPU 25 determines based on the received copying machine information whether or not information regarding the number of print jobs has been received, and where it is determined that such information has been received (YES in S23), the CPU 25 advances to S24. On the other hand, where it is determined that information regarding the number of print jobs has not been received (NO in S23), the CPU 25 repeats this determination routine.

In S24, the CPU 25 determines whether or not the ambient temperature detected by the temperature sensor 21 exceeds the preset temperature th3, and where it is determined that the ambient temperature exceeds the preset temperature th3 (YES in S24), it becomes necessary to cool the air in the room because the heat generated from the copying machine 10 will further increase the ambient temperature, and the CPU 25 advances to S25. Where it is determined that the ambient temperature is equal to or lower than the preset temperature th3 (NO in S24) on the other hand, it is necessary to turn down the heating of the room as heat will be generated by the copying machine, and the CPU 25 advances to S26.

In S25, the CPU 25 increases the cooling power in accordance with the received information regarding the number of print jobs, and advances to S27. In S26, the CPU 25 reduces the heating power in accordance with the received information regarding the number of print jobs.

Because the number of print jobs and the heat that will be generated due to the operation of the digital copying machine 10 correspond to each other, when the cooling power is increased or the heating power is reduced in accordance with the number of print jobs, the ambient temperature can be adjusted in accordance with the heat that will be generated due to the operation of the digital copying machine 10.

In S27, the CPU 25 determines based on the received copying machine information whether or not printing by the digital copying machine 10 has been completed, and where it is determined that printing has been completed (YES in S27), the CPU 25 advances to S28. Where it is determined that printing has not been completed (NO in S27) on the other hand, the CPU 25 returns to S23 and performs ambient temperature adjustment once more.

Determination is made in this manner in regard to printing by the digital copying machine 10 because if the printing is finished, the digital copying machine 10 no longer generates heat, and it is accordingly no longer necessary to adjust the ambient temperature in accordance with the temperature in the digital copying machine 10.

In S28, after the printing by the digital copying machine 10 is completed, the CPU 25 performs regular air conditioning control and returns to S21.

Through such air conditioning control, the cooling power is increased or the heating power is reduced by the amount set in S25 or S26, such that an optimal ambient temperature corresponding to the amount of heat released from the digital copying machine 10 is achieved.

In this embodiment, the digital copying machine 10 adjusts the adjustment means, i.e., the exhaust fan 130, the condensation prevention heater 140 and the moisture elimination heaters 150, based on the ambient temperature and humidity, but it is also acceptable if at least one of the adjustment means is adjusted based on the ambient temperature or humidity.

In addition, in this embodiment, the air conditioner 2 and the digital copying machine 10 transmit and receive information via the home server 11. In essence, the home server 11 functions as a gateway that passively transmits data between the air conditioner 2 and the copying machine 10. In another embodiment of the invention, the air conditioner 2 and the digital copying machine 10 can transmit and receive information directly to and from each other. In such an embodiment, a gateway or the like is not used to pass the information between these two devices.

Figure 7:
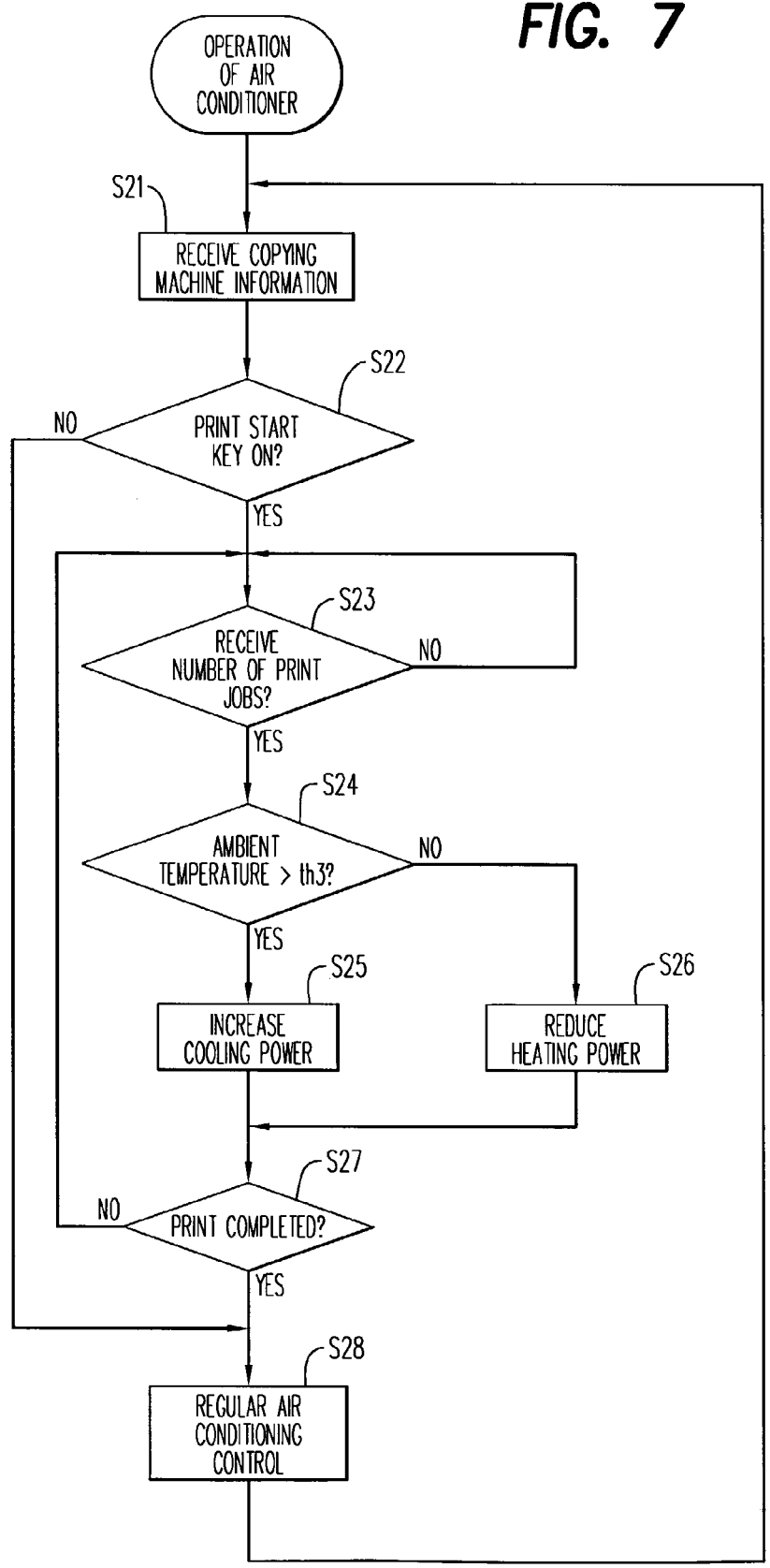
FIG. 7 is a flow chart showing the operation of the air conditioner.

In the previously described embodiment, the analysis of the copy machine operation and determination whether to increase cooling power or reduce heating power, as represented in the flow chart of FIG. 7, is performed within the air conditioner 2. In some cases, the air conditioner may not have the capability to perform these operations. For instance, it may be desirable to employ an existing conventional air conditioner that has not been retrofitted with a CPU 25 and/or software to perform these functions. In an alternate embodiment of the invention, the server 11 can be employed to implement this functionality. In this case, the server does not merely function as a passive gateway, but rather operates as an active control mechanism within the automation system.

Figure 8:
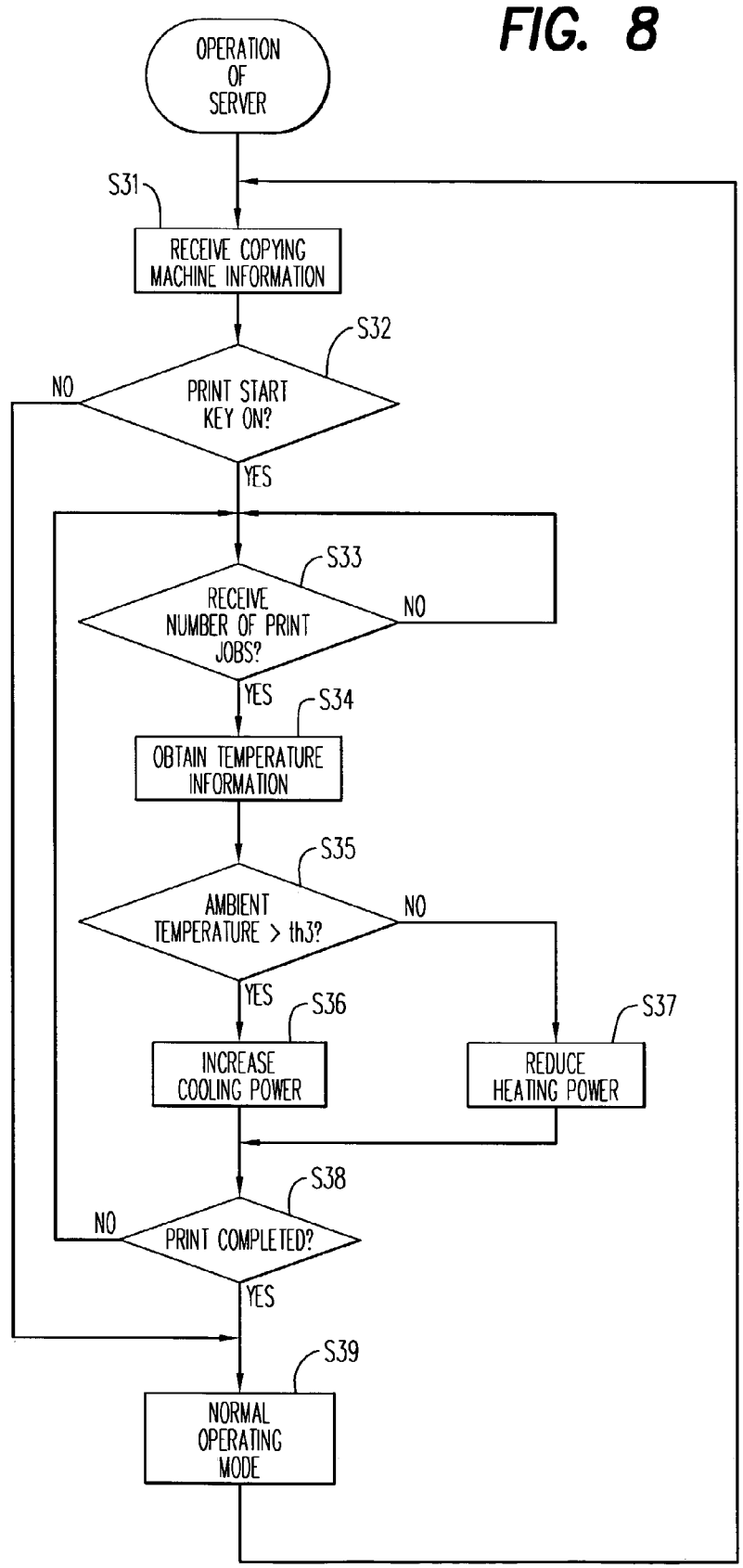
FIG. 8 is a flow chart showing the operation of the server in an alternate embodiment of the invention.

FIG. 8 is a flow chart illustrating the operation of the server 11 in accordance with the alternate embodiment of the invention. At S31, the server receives copying machine information from the digital copying machine 10. After receiving this information, at S32 the server detects whether the print start key on the operation panel 116 of the digital copying machine has been turned ON, based on the received information. If the print start key has been turned ON, the server advances to S33. On the other hand, if the print start key has not been turned ON, the server jumps to S39.

At S33, the server determines whether information regarding the number of print jobs has been received from the digital copier 10. If not, the server remains at S33 until the information is received. Once the information regarding the number of print jobs is received, the server advances to S34, where it obtains ambient temperature information from the air conditioner 2. Then, at S35, the server determines whether the ambient temperature exceeds the preset temperature limit th3. If the ambient temperature exceeds the temperature limit, at S36 the server sends a signal to the air conditioner 2 to increase cooling power, in accordance with the received information regarding the number of print jobs. If the ambient temperature does not exceed the temperature limit th3, at S37 the server sends a signal to the air conditioner 2 to decrease heating power, to account for the heat that will be generated by the copier 10 during the printing of the copies.

At S38, the server determines whether printing by the digital copier 10 has been completed, based on the latest information received from the copier. If it has not, the server returns to S33 and performs ambient temperature adjustment again. Once the printing operation has been determined to be complete at S38, the server advances to S39 where it returns the air conditioner to its normal mode of operation, e.g., it cancels the signals sent at S36 or S37. Thereafter, the server returns to S31.

In the preceding description, the air conditioner 2 performs air conditioning in accordance with the ambient temperature, but such air conditioning may be performed based on the moisture content instead of or in addition to the temperature.

Furthermore, the home automation system described above includes a refrigerator 1, a home heater 3, a fluorescent lamp 4, a microwave oven 5, a washing machine 6, a television receiver 7, a clock 8 and a telephone 9, but the home automation system may include only one or more or none of these electronic appliances.

According to one aspect of the invention, the image forming apparatus reads the operation information regarding the number of print jobs in process therein, for example, and transmits such operation information to the air conditioner. The air conditioner adjusts the ambient temperature and/or humidity in the room in which the image forming apparatus is installed in accordance with the heat expected to be generated due to the operation of the image forming apparatus, based on the received information regarding the operation of the image forming apparatus. Accordingly, the burden on the cooling function, the moisture eliminating function or the condensation preventing function of the image forming apparatus can be reduced, and power conservation and less noise can be achieved in connection with the image forming apparatus.

According to another aspect of the invention, the image forming apparatus receives information regarding the ambient temperature and/or humidity from the detecting means included in the air conditioner or the like, and controls, based on such received information regarding the ambient temperature and/or humidity, adjustment means such as the exhaust fan, the condensation prevention heater and the moisture elimination heaters to adjust the temperature and/or moisture content inside the image forming apparatus. Therefore, since the temperature and/or moisture content inside the image forming apparatus are adjusted in accordance with the ambient state in the room in which the image forming apparatus is installed, power conservation and less noise can be achieved for the image forming apparatus in connection with the cooling, moisture eliminating and condensation preventing functions thereof.

Moreover, because information regarding the temperature and/or humidity is detected by the detecting means included in the air conditioner the image forming apparatus does not need to separately include detecting means that detects the temperature and/or humidity, resulting in a simpler construction, reduced cost and increased power conservation for the image forming apparatus.

According to a further aspect of the invention, because the temperature and/or moisture content inside the apparatus are adjusted in accordance with the ambient state in the room in which the image forming apparatus is installed even when the power is OFF, power conservation is achieved for the image forming apparatus while the paper is prevented from having a high moisture content and the mirrors and the lenses are prevented from having condensation immediately after the power is turned ON.

What is claimed is:

1. An image forming apparatus which is connected to a network, comprising:
    a communication unit which receives information from an air conditioner unit about an ambient condition of an area in which the image forming apparatus is installed, the air conditioner unit being external to the image forming apparatus; and
    an adjusting unit which controls internal devices located only inside the image forming apparatus in accordance with the received information and a threshold value, independently of an image-forming operation, wherein the internal devices adjust environmental temperature and/or environmental moisture content inside the image forming apparatus.

2. The image forming apparatus according to claim 1, wherein the communication unit and the adjusting unit are connected to a power supply even when a main switch of the image forming apparatus is off.

3. The image forming apparatus according to claim 1, wherein the devices include a heater and/or a fan, and wherein the adjusting unit controls the heater and/or the fan in accordance with the information received by the communication unit.

4. The image forming apparatus according to claim 1, wherein the information received by the communication unit is ambient temperature.

5. The image forming apparatus according to claim 1, wherein the image forming apparatus is related to printing.

6. A method of controlling an image forming device that is operatively coupled to communicate with an air conditioner, comprising the following steps:
    receiving information from said air conditioner regarding at least one ambient condition in an area external to the image forming device;
    determining whether said ambient condition is greater than a threshold value; and
    activating a system located within said image forming device that only regulates an environmental internal condition of said image forming device in dependence upon whether said ambient condition is greater than said value, wherein the activating step is independent from an image-forming operation.

7. The method of claim 6, wherein said ambient condition is humidity, and said activating step comprises activating at least one internal heater if the humidity exceeds the threshold value.

8. The method of claim 7, further including the step of detecting whether a main power switch for the image forming device is turned on, and performing said activating step only when the main power switch is off and the at least one internal heater is connected to a power supply separate from the main power switch.

9. The method of claim 6, wherein said ambient condition is temperature, and further including the step of activating a cooling fan if the temperature exceeds the threshold value.

10. The method of claim 9, further including the steps of detecting whether the image forming device is performing a printing operation, and activating-said cooling fan only when a printing operation is being performed.

* * * * *